United States Patent

Hübinger et al.

[11] Patent Number: 6,086,723
[45] Date of Patent: Jul. 11, 2000

[54] PROCESS FOR COOLING DISPERSIONS AND LIQUIDS

[75] Inventors: Wolfgang Hübinger, Limburgerhof; Rainer Wunder, Dudenhofen; Gerhard Bauer, Weinheim; Johannes Dobbelaar, Wachenheim; Sven Lawrenz, Mannheim; Franz-Josef Mueseler, Neustadt; Jürgen Nahstoll, Eisenberg; Robert Rupaner, Ellerstadt; Christian-Ulrich Schmidt, Mannheim, all of Germany

[73] Assignee: BASF Aktiengesellschaft, Ludwigshafen, Germany

[21] Appl. No.: 09/134,926

[22] Filed: Aug. 17, 1998

[30] Foreign Application Priority Data

Aug. 18, 1997 [DE] Germany ............ 197 35 807

[51] Int. Cl.$^7$ ................ B01D 3/10; B01D 3/38
[52] U.S. Cl. ................ 203/95; 203/20; 203/96; 203/DIG. 25; 422/26; 422/39; 422/5
[58] Field of Search ................ 203/20, 91, 88, 203/90, 49, 92–98, DIG. 25; 202/264, 236; 95/157, 160, 162; 159/48.1, 48.2, DIG. 4, DIG. 16, DIG. 10, DIG. 40; 422/5, 26, 1, 38, 39, 33, 28

[56] References Cited

U.S. PATENT DOCUMENTS

| | | | |
|---|---|---|---|
| 1,449,114 | 3/1923 | Hayduck | 96/179 |
| 2,384,998 | 9/1945 | Haugh | 159/48 |
| 2,887,390 | 5/1959 | Coulter et al. | 99/199 |
| 3,341,429 | 9/1967 | Fondrk | 203/95 |
| 3,512,570 | 5/1970 | Ess et al. | 159/48.1 |
| 3,968,067 | 7/1976 | Burke, Jr. | 523/328 |
| 4,297,112 | 10/1981 | Naylor | 96/200 |
| 4,378,317 | 3/1983 | Seguine | 554/205 |
| 5,139,683 | 8/1992 | Endo et al. | 210/744 |
| 5,401,866 | 3/1995 | Cheng et al. | 554/184 |
| 5,437,714 | 8/1995 | Cook et al. | 96/201 |

*Primary Examiner*—Virginia Manoharan
*Attorney, Agent, or Firm*—Keil & Weinkauf

[57] ABSTRACT

A process for deodorizing and subsequently cooling dispersions or liquids comprising
a) passing steam through the dispersion or liquid to be cooled and held in a vessel (1), said dispersion or liquid being caused to foam up as a result,
b) discharging the foam from the top section of the vessel via a nozzle (5) into an evacuated separation vessel (4), the foam being broken in the process,
c) condensing the water vapor formed from the foam in a heat exchanger (8) and removing volatile organic components at the same time, and
d) returning the broken foam to the vessel (1),
in which the steps a) to d) are performed until the dispersion or liquid has been deodorized to the desired extent, wherein, after completion of the deodorization (in accordance with steps a) to d)), the hot dispersion or liquid is discharged from the bottom section of the vessel (1) through the nozzle (5) into the evacuated separation vessel (4), so that the dispersion or the liquid is cooled, the nozzle (5) and the evacuated separation vessel (4) also being used beforehand for performing step b), wherein the water vapor held in the separation vessel (4) is condensed at the heat exchanger (8) which was also employed beforehand in step c), and wherein the cooled dispersion or liquid is discharged from the bottom of the separation vessel (4).

8 Claims, 1 Drawing Sheet

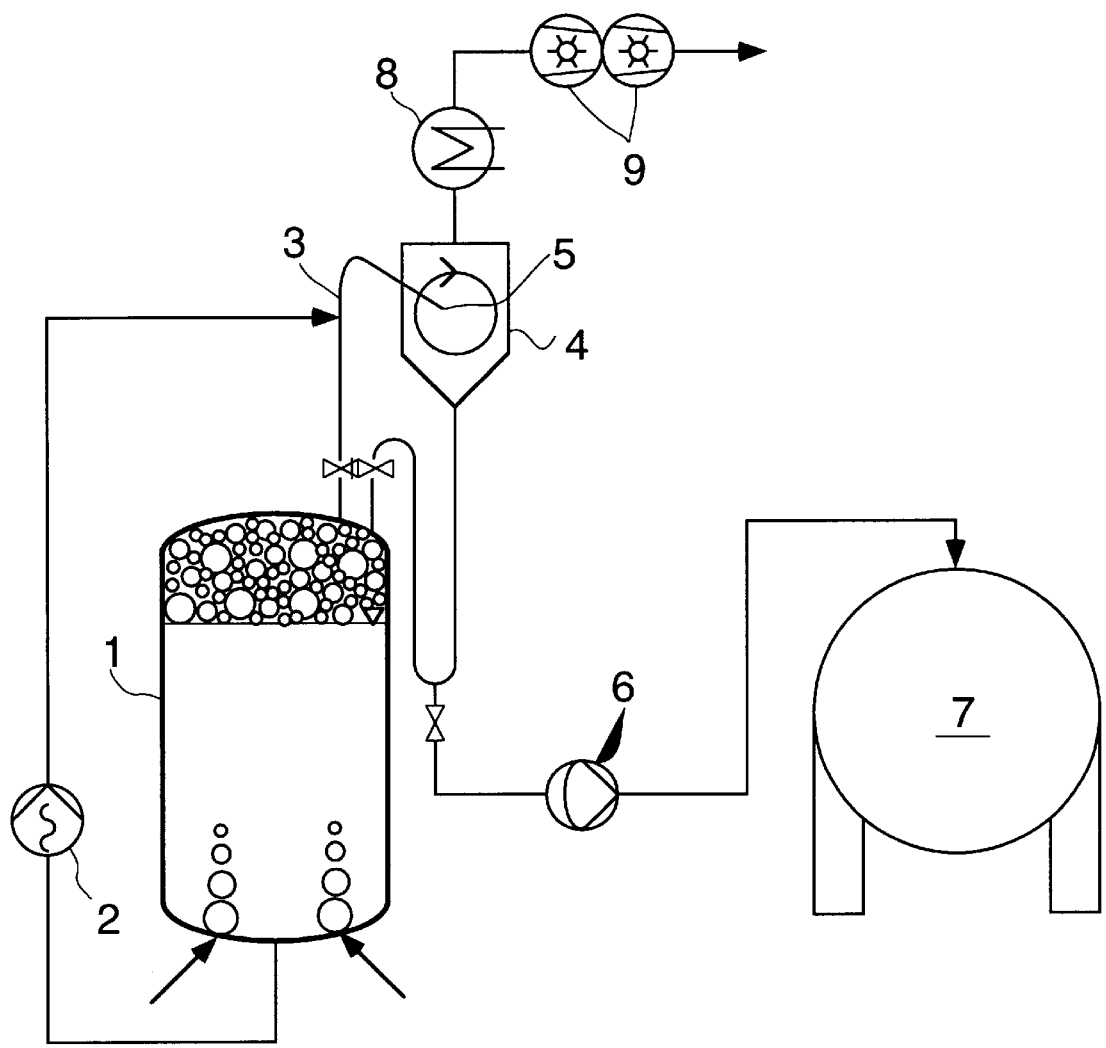

PROCESS FOR COOLING DISPERSIONS AND LIQUIDS

BACKGROUND OF THE INVENTION

The invention relates to a process for cooling dispersions and liquids, which are first deodorized in a vessel.

It is known to prepare polymer dispersions by suspension polymerization or emulsion polymerization. The products usually still contain undesirable volatile organic components such as residual monomers resulting from incomplete reaction, impurities from the starting materials, decomposition products of the initiators or low molecular weight products from side reactions. These compounds are referred to hereinafter by the collective term "residual volatiles". In the Commission's decision 96/13/EC regarding the definition of environmental criteria for issuing the EC environmental symbol for interior paints and coatings of Dec. 15, 1995, these residual volatiles are divided into volatile organic compounds (VOC) and volatile aromatic hydrocarbons. In both cases these are organic compounds having a boiling point (or initial boiling point) of at most 250° C. under atmospheric pressure conditions. The volatile aromatic hydrocarbons in this context have at least one aromatic nucleus in their structural formulae. The collective term "residual volatiles" used herein refers to all such organic compounds having a boiling point (or initial boiling point) of at most 250° C.

Residual volatiles can be present not only in dispersions, but also in liquids. For example, when a dispersion formed by emulsion polymerization is broken by means of an electrolyte or acid, at least some of the residual volatiles remain in the liquid which separates from the polymer. The residual volatiles may present problems in connection with environmentally compatible disposal of such liquids. Furthermore, residual volatiles are undesirable for many applications of dispersions or suspensions, for example in the food or cosmetics sector or for interior applications, and what is aimed for is substantially complete elimination of these.

Dispersions or liquids are therefore subjected to a treatment which removes the residual volatiles. This treatment is referred to as deodorization. Various methods and apparatuses are known for this purpose: Apart from chemical processes, which usually, however, affect only the unsaturated compounds, these are predominantly stripping processes in which a stripping gas is passed through the suspension or dispersion. The stripping gases used are air, nitrogen, supercritical carbon dioxide, ozone or steam. Apparatuses in which the suspension or dispersion is treated with the stripping gas may take various forms. In the simplest design, the apparatus comprises a vessel which holds the suspension or dispersion and into which the stripping gas is introduced by means of lances or valves at the vessel bottom.

BRIEF DESCRIPTION OF THE DRAWING

The drawing is a schematic representation of an apparatus capable of performing the process of the invention.

DETAILED DESCRIPTION OF THE INVENTION

In accordance with the DRAFT International Standard ISO/DIS 13741, part 1, the level of residual volatiles in this context is measured by means of gas chromatography. In this standard, they are referred to as residual monomers and other organic components. Examples mentioned include acrylic esters such as n-butyl acrylate and isobutyl acrylate, methacrylic esters such as methyl methacrylate, acrylonitrile, butadiene, styrene, vinyl acetate, vinyl chloride, but also by-products, for example acetaldehyde and ethylbenzene. Also listed are propionitrile, ethyl acrylate and 4-vinylcyclohexene.

The desired extent of deodorization, the thoroughness with which residual volatiles are removed, depends on the application and quality or on the environmental compatibility of the dispersions or liquids in question. Those dispersions and liquids which are preferred for the process are listed below.

Liquids

The liquids used in the process according to the invention can be any liquid having a removable level of residual volatiles. Preferentially used are aqueous solutions or liquids having a high viscosity. Examples of such liquids include solutions which result from suspension polymerization or emulsion polymerization after the polymer has been separated off, or viscous liquids such as relatively long-chain paraffin waxes or glycols containing undesirable volatile components, in particular if they serve as solvents. Further examples include polymer solutions, especially aqueous polymer solutions. These, having been prepared in the relevant solvent, often still contain residual monomers and other components that can be removed by deodorization.

Dispersions

The dispersions employed in the novel process can be any dispersions which contain removable levels of residual volatiles. Examples of such dispersions may be dispersions of contaminated soils, dispersions of inorganic particles, dispersions of biological molecules and preferably dispersions of organic compounds, especially polymer dispersions, the dispersions preferably being aqueous dispersions.

The aqueous polymer dispersions preferentially suitable for the process according to the invention are fluid systems which, as the disperse phase in the aqueous dispersing medium, contain polymer particles in a stable disperse distribution. The diameter of the polymer particles is generally mainly in the range of from 0.01 to 5 μm, frequently mainly in the range of from 0.01 to 1 μm. The stability of the disperse distribution often extends over a period of at least one month, in many cases even over a period of at least 6 months.

Just like polymer solutions when the solvent is evaporated, aqueous polymer dispersions have the tendency, when the aqueous dispersing medium is being evaporated, to form polymer films, which is the reason why aqueous polymer dispersions are applied in a variety of ways as binders, e.g. for paints or compounds for coating leather.

As a matter of principle, a distinction is drawn, with aqueous polymer dispersions, between aqueous secondary dispersions and aqueous primary dispersions. The aqueous secondary dispersions are those, in the course of whose preparation the polymer is produced outside the aqueous dispersing medium, for example in solution of a suitable nonaqueous solvent. This solution is then transferred into the aqueous dispersing medium and the solvent, while dispersion is taking place, is separated off, as a rule by distillation. In contrast, aqueous primary dispersions are those where the polymer is produced directly in a disperse distribution in the aqueous dispersing medium itself. All the preparation processes essentially have in common that the build-up of the polymer involves the use, either exclusively or together with other materials, of monomers having at least one ethylenically unsaturated group.

The incorporation of such monomers having at least one ethylenically unsaturated group usually takes place by initiated polymerization, the nature of initiation being determined, in particular, by the desired performance characteristics of the target product and consequently being tailored to these. Possible examples are ionic and free-radical initiation. However, incorporation can also take place by catalytically initiated polymer-analogous reaction. Free-radical initiation is employed particularly frequently, and so the incorporation of the monomers containing ethylenically unsaturated groups as a rule takes place by free-radical aqueous emulsion polymerization in the case of aqueous primary dispersions and by free-radical solution polymerization in the case of aqueous secondary dispersions.

The polymerization conditions are chosen so as to achieve the desired characteristics of the polymer such as molecular weight, molecular weight distribution and the degree of branching. If rapid reaction is the objective, it is not advisable, as a rule, to carry the reaction to completion. The aqueous polymer dispersions obtained after the reaction therefore normally still contain monomers, especially ethylenically unsaturated ones. Owing to the increased reactivity of the ethylenically unsaturated double bond, such residual monomers, such as acrylonitrile and vinyl acetate, are toxicologically not entirely safe and should therefore be removed from the dispersion. This purpose is served by the present process. The process can be used for any polymers dispersed in an aqueous medium, irrespective of the type of the polymers. The term "polymer" therefore comprises, in the present context, both polycondensates such as polyesters, polyadducts such as polyurethanes and polymers accessible by ionic or free-radical polymerization. Mixed versions of said syntheses likewise produce dispersions which can be used according to the invention, as do copolymers.

The preparation of aqueous polymer dispersions of the various abovementioned polymer types is known, for example from Encyclopedia of Polymer Science and Engineering, Volume 8, p. 659 et seq. (1987); D. C. Blackley, in High Polymer Latices, Volume 1, p. 35 et seq. (1966); H. Warson, The Application of Synthetic Resin Emulsions, p. 246 et seq., Chapter 5 (1972); [Publishers?] D. Diederich, Chemie in unserer Zeit, 24, pp. 135 to 142 (1990); Emulsion Polymerization, Interscience Publishers, New York (1965); DE-A 40 03 422, and Dispersionen synthetischer Hochpolymerer, F. Hölscher, Springer-Verlag, Berlin (1969).

Monomers having at least one monoethylenically unsaturated group, which are suitable for the novel process, inter alia include, in particular, monomers lending themselves to straightforward free-radical polymerization, such as the olefins, for example ethylene, vinyl aromatic monomers such as styrene, $\alpha$-methylstyrene, o-chlorostyrene or vinyltoluenes, esters of vinyl alcohol and monocarboxylic acids having from 1 to 18 C atoms, such as vinyl acetate, vinyl propionate, vinyl n-butyrate, vinyl laurate, vinyl pivalate and vinyl stearate, and commercially available monomers VEOVA 9 to 11 (VEOVA is a trade name of Shell and means vinyl ester of carboxylic acids which are also referred to as Versatic® X acids), esters of $\alpha,\beta$-monoethylenically unsaturated mono- and dicarboxylic acids having preferably from 3 to 6 C atoms, such as acrylic acid, methacrylic acid, maleic acid, fumaric acid and itaconic acid, with alkanols generally having from 1 to 12, preferably from 1 to 8 and especially from 1 to 4 C atoms, such as the methyl, ethyl, n-butyl, isobutyl, t-butyl and 2-ethylhexyl esters of acrylic acid and methacrylic acid, dimethyl maleate or n-butyl maleate, nitriles of $\alpha,\beta$-monoethylenically unsaturated carboxylic acids such as acrylonitrile, and $C_{4-8}$-conjugated dienes such as 1,3-butadiene and isoprene. In the case of aqueous polymer dispersions produced exclusively by the method of free-radical aqueous emulsion polymerization, these monomers as a rule form the principal monomers which, based on the overall amount of monomers to be polymerized by the free-radical aqueous process normally make up a fraction of more than 50 wt %. In general, these monomers are only moderately to sparingly soluble in water under standard conditions (25° C., 1 atm).

Examples of monomers whose solubility in water under the abovementioned conditions is higher include $\alpha,\beta$-monoethylenically unsaturated mono- and dicarboxylic acids and their amides, such as acrylic acid, methacrylic acid, maleic acid, fumaric acid, itaconic acid, acrylamide and methacrylamide, also vinylsulfonic acid and its water-soluble salts, and N-vinylpyrrolidone.

In the case of aqueous polymer dispersions produced exclusively by free-radical aqueous emulsion polymerization, the abovementioned monomers having increased water solubility are normally copolymerized only as modifying monomers in amounts, based on the overall amount of the monomers to be polymerized, of less than 50 wt %, as a rule from 0.5 to 20, preferably from 1 to 10 wt %.

Monomers which usually increase the internal strength of the films formed from the aqueous polymer dispersions normally have at least one epoxy, hydroxyl, N-methylol, carbonyl or at least two nonconjugated ethylenically unsaturated double bonds. Suitable examples of these are N-alkylamides of $\alpha,\beta$-monoethylenically unsaturated carboxylic acids having from 3 to 10 C atoms and esters thereof with alkenols having from 1 to 4 C atoms, among which the N-methylolacrylamide and the N-methylolmethacrylamide are particularly preferred, monomers containing two vinyl radicals, monomers containing two vinylidene radicals, and monomers containing two alkenyl radicals.

Particularly advantageous in this context are the diesters of dihydric alcohols with $\alpha,\beta$-monoethylenically unsaturated monocarboxylic acids, among which acrylic and methacrylic acid are preferred. Examples of such monomers containing two nonconjugated ethylenically unsaturated double bonds are alkylene glycol diacrylates and dimethacrylates such as ethylene glycol diacrylate, 1,3-butylene glycol diacrylate, 1,4-butylene glycol diacrylates and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. Of particular significance in this connection are also the $C_1-C_8$-hydroxyalkyl esters of methacrylic acid and acrylic acid, such as n-hydroxyethyl, n-hydroxypropyl or n-hydroxybutyl acrylate and methacrylate and compounds such as diacetoneacrylamide and acetylacetoxyethyl acrylate and methacrylate, ureidoethyl methacrylate and acrylamidoglycolic acid. In the case of aqueous polymer dispersions produced exclusively by the method of free-radical aqueous emulsion polymer-ization, the abovementioned monomers are usually copolymerized in amounts of from 0.5 to 10 wt %, based on the overall amount of the monomers to be polymerized.

In the course of free-radical aqueous emulsion polymerization it is common to include dispersants which ensure the stability of the aqueous polymer dispersion produced.

Dispersants to be considered include emulsifiers as well as the protective colloids normally used for carrying out free-radical aqueous emulsion polymerizations.

Suitable protective colloids are, for example, poly(vinyl alcohols), cellulose derivatives or copolymers containing vinyl pyrrolidone. A detailed description of further suitable protective colloids is found in Houben Weyl, Methoden der organischen Chemie, Volume XIV/1, Makromolekulare Stoffe [Macromolecular substances], Georg-Thieme-Verlag, Stuttgart, 1969, pp. 411 to 420. It is of course also possible to use mixtures of emulsifiers and/or protective colloids. The dispersants used are preferably exclusively emulsifiers whose relative molecular weights, in contrast to the protective colloids, are usually below 1000. They may be anionic, cationic or nonionic. If mixtures of surface-active substances are used, the individual components must of course be compatible with one another, which can be checked with a few preliminary experiments if there is any doubt. In general, anionic emulsifiers are compatible with one another and with nonionic emulsifiers.

The same applies to cationic emulsifiers, whereas anionic and cationic emulsifiers are usually mutually incompatible. Examples of common emulsifiers are ethoxylated mono-, di- and trialkylphenols (EO units: from 3 to 100, alkyl: $C_4$ to $C_{12}$), ethoxylated fatty alcohols (EO units: from 3 to 100, alkyl: $C_8$ to $C_{18}$), and alkali metal salts and ammonium salts of alkyl sulfates (alkyl: $C_8$ to $C_{16}$), of sulfuric acid hemiesters of ethyloxylated alkylphenols (EO units: from 3 to 100, alkyl: $C_4$ to $C_{12}$), of alkylsulfonic acids (alkyl: $C_{12}$ to $C_{18}$) and of alkylarylsulfonic acids (alkyl: $C_9$ to $C_{18}$). Further suitable emulsifiers such as sulfosuccinic esters are found in Houben-Weyl, Methoden der organischen Chemie, Volume XIV/1, Makromolekulare Stoffe, Georg-Thieme Verlag, Stuttgart, 1961, pp. 192 to 208.

As a rule, the amount of dispersant used is from 0.5 to 6, preferably from 1 to 3 wt %, based on the weight of the monomers to undergo free-radical polymerization.

Of course, the abovementioned dispersants are quite generally suitable for stabilizing the process products according to the invention. The novel process products also comprise, however, aqueous polymer dispersions of self-emulsifying polymers, i.e. of polymers having ionic groups which, owing to the repulsion of charges of equal sign are able to effect stabilization. Preferably, the direct novel process products exhibit anionic stabilization (in particular anionic dispersants).

Definition and determination of relevant quantities to be measured

Glass transition temperature

The glass transition temperature is preferentially determined from the temperature dependence of the specific heat in a differential thermal analysis (G. Goldbach in: Kunststoffe, Ordnungszustände und Eigenschaften [Plastics, states of order and properties] in: Ullmanns Encyklopädie der technischen Chemie, Volume 15, pp. 219 to 222, Weinheim, 1980).

The glass transition temperature of copolymers can also be calculated from the glass transition temperatures of the particular homopolymers, weighted in accordance with the mass fraction of the monomers and the coefficients of expansion of the polymers.

Minimum film-forming temperature

The minimum film-forming temperature of the polymer is the lowest temperature at which a dispersion still just forms a coherent film after the water has evaporated. It is close to the glass transition temperature of the polymer (H. Gerrens in: Polymerisationstechnik [Polymerization technology] in: Ullmanns Encyklopädie der technischen Chemie, Volume 19, p. 141, Weinheim, 1989).

The measuring instrument used is a metal plate to which a temperature gradient is applied. What is observed is at what temperature the film begins to show cracks (E. Penzel in: Polacryl- und Polymethacryl-Verbindungen [Polyacrylic and polymethacrylic compounds] in: Ullmanns Encyklopädie der technischen Chemie, Volume 19, pp. 17 to 18, Weinheim, 1980).

The glass transition temperature of the acrylates preferentially used as the dispersion in the novel process is between −62 and +6° C. (see Table 8 from E. Penzel in: Polyacryl- und Polymethacryl-Verbindungen in: Ullmanns Encyklopädie der technischen Chemie, Volume 19, pp. 17 to 18, Weinheim, 1980). The resultant minimum film-forming temperatures of the polymers in the dispersions are accordingly often far below the process operating temperature preferred according to the invention. The dispersions to be treated therefore tend to be soft at the process temperature and readily form films.

Viscosity

Dispersions exhibit a large range in rheological behavior. The flow behavior depends on the solids content, the particle size, the particle size distribution and on the system of auxiliaries that was used during the preparation. Commonly observed anomalies in flow behavior include pseudoplasticity and dilatancy.

The viscosity is measured under standardized measurement conditions in capillary viscometers, Couette viscometers or cone and plate viscometers (C. Gerth: Rheometrie [Rheometry], Ullmanns Encyklopädie der technischen Chemie, volume 19, pp. 17 to 18, Weinheim 1980).

Aqueous polymer dispersions generally are very good film formers and have a tendency to skinning at the polymerization temperature. Because of this they have to be cooled to below 35° C. for storage and transport. Such dispersions contain from 30 to 80% of water and therefore have a high heat capacity, which is usually above 3 kJ/kg K. Depending on the application, they have a viscosity of from about 20 mPas to 10 Pas. Cooling of such a dispersion accordingly requires large amounts of heat to be dissipated.

With low-viscosity dispersions having a viscosity of less than 100 mPas, cooling as a rule presents no problems. Such dispersions can be cooled by means of a jacket bath while still held in the vessel they were prepared in, or alternatively while the product is transferred to a standardization vessel or storage tank. This purpose is served by external heat transfer units by means of which the dispersions are brought to the desired temperature. For dispersions having higher viscosities however, this indirect heat dissipation is not straightforward, since the heat transfer coefficient $h_w$ can drop to below 100 W/m$^2$ K. This results in correspondingly large heat transfer areas or very long cooling times.

Since the enthalpy of evaporation of water, at 2260 KJ/kg, is very high, it can be utilized to cool dispersions. To this end, the dispersion is introduced into a partial vacuum which is below the partial pressure of water. Water evaporates, and the dispersion cools in the process, its concentration at the same time increasing by a few percent, which generally is a desirable side effect. This increase in concentration is also utilized in a known manner as the main effect, by the dispersion being heated cyclically and being depressurized into a partial vacuum until the desired solids content is reached (U.S. Pat. No. 3,073,380).

Physical deodorization by stripping with steam often makes use of an apparatus referred to as a batch stripper. One embodiment and the corresponding process are described in DE-A-1 248 943. In the process, the dispersion or liquid after the deodorization step, depending on the product characteristics, will be at between about 60 and 90° C. This dispersion or liquid can then be cooled by "after-running"

(being allowed to stand or being stirred under reduced pressure without steam being introduced). In practice, however, very serious fouling of the apparatus will occur if polymer-containing dispersions are used. The dispersion forms films and skins which accrete to form a wall coating which eventually drops off and can block the apparatus. This leads to frequent and laborious cleaning operations and consequently to production outages.

These problems equally occur when cooling is achieved by means of a jacket bath. Furthermore, especially where viscous dispersions or liquids are cooled by means of a jacket bath, the cooling times are very long.

The economic viability of the above-described process is affected by the duration of the cooling operation and, in the case of particular dispersions being used, also by the extent of concomitant fouling of the apparatus.

It is an object of the present invention to improve the above-described deodorization process in such a way that
1. the cooling time of the dispersion or of the liquid after said deodorization is shortened,
2. in the case of polymer-containing dispersions during cooling no skinning or film formation takes place which would entail fouling and/or blocking of the apparatus,
3. at the same time the complexity of the apparatus is minimized.

The subject is achieved by a process for cooling dispersions or liquids after a deodorization by means of
  a) steam being passed through the dispersion or liquid to be cooled and held in a vessel, said dispersion or liquid being caused to foam up as a result,
  b) the foam being discharged from the top section of the vessel via a nozzle into an evacuated separation vessel, the foam being broken in the process,
  c) the water vapor formed from the foam being condensed in a heat exchanger and volatile organic components being removed at the same time, and
  d) the broken foam being returned to the vessel, the steps a) to d) being performed until the dispersion or liquid has been deodorized to the desired extent.

What the process according to the invention is defined by is that, after completion of the deodorization (in accordance with steps a) to d)), the hot dispersion or liquid is discharged from the bottom section of the vessel through the nozzle into the evacuated separation vessel, so that the dispersion or the liquid is cooled, the nozzle and the evacuated separation vessel also being used beforehand for performing step b), that the water vapor held in the separation vessel is condensed at the heat exchanger which was also employed beforehand in step c), and that the cooled dispersion or liquid is discharged from the bottom of the separation vessel.

Surprisingly, we have found that the feeder nozzle used for the evacuated separation vessel is suitable for two different applications:
1st application: breaking of the foam (owing to the abrupt pressure difference) during deodorization and
2nd application: cooling of the deodorized dispersion or liquid during transfer into the evacuated separation vessel.

Consequently, it is possible for not only the nozzle, but also the greater part of the apparatus, specifically the evacuated separation vessel, the heat exchanger and the pump, to be used both for the deodorization process and for the cooling process. As a result, the complexity of the apparatus is reduced and the efficiency of the process is improved.

According to an advantageous embodiment of the invention, the hot dispersion is pumped off from the vessel by means of a pump and passed into a riser to the separation vessel. In the process, the separation vessel is advantageously evacuated to from 30 to 100 mbar absolute, preferably 50 mbar absolute. The foam collecting at the bottom of the separator is delivered into a product tank by means of a pump. The water vapor formed from the dispersion is condensed in a heat transfer unit. The vacuum in the separation vessel is preferably generated by means of a two-stage water-ring pump.

Polymer dispersions are generally cooled to below 35° C., to counteract subsequent film formation in the vessel 7. The process preferably employs high-viscosity dispersions or liquids.

Further details and advantages of the invention can be gathered from the specific embodiment depicted in the drawing. There the hot dispersion or liquid after deodorization is pumped off from the vessel 1 by means of a pump 2 and is passed via the riser 3 through the nozzle 5 to the separation vessel 4 which has been evacuated to 50 mbar (corresponding to 33° C.). The cooled dispersion or liquid collects at the bottom of the separator 4, whence it is delivered by means of the pump 6 into a vessel 7 for the finished product. The water vapor formed from the dispersion or liquid is condensed in a heat exchanger 8 and recycled. The required vacuum is generated by means of a two-stage water-ring pump 9.

We claim:

1. A process for deodorizing and subsequently cooling dispersions or liquids comprising
  a) passing steam through the dispersion or liquid to be deodorized and held in a vessel (1), said dispersion or liquid being caused to foam up as a result,
  b) discharging the foam from the top section of the vessel via a nozzle (5) into an evacuated separation vessel (4), the foam being broken in the process,
  c) condensing the water vapor formed from the foam in a heat exchanger (8) and removing volatile organic components at the same time, and
  d) returning the broken foam to the vessel (1), the steps a) to d) being performed until the dispersion or liquid has been deodorized to the extent required for its intended application, wherein, after completion of the deodorization in accordance with steps a) to d), the dispersion or liquid is discharged from the bottom section of the vessel (1) through the nozzle (5) into the evacuated separation vessel (4), so that the dispersion or the liquid is cooled, the nozzle (5) and the evacuated separation vessel (4) also being used beforehand for performing step b), wherein the water vapor held in the separation vessel (4) is condensed at the heat exchanger (8) which was also employed beforehand in step c), and wherein the cooled dispersion or liquid is discharged from the bottom of the separation vessel (4).

2. A process as claimed in claim 1, wherein the dispersion or liquid is pumped from the vessel (1) by means of a pump (2) and is passed to the separation vessel (4) in a riser.

3. A process as claimed in claim 2, wherein the separation vessel (4) is evacuated to a pressure of from 30 to 100 mbar absolute.

4. A process as claimed in claim 3, wherein the separation vessel (4) is evacuated to a pressure of 50 mbar absolute.

5. A process as claimed in claim 1, wherein the vacuum is generated by means of a two-stage water-ring pump (9).

6. A process as claimed in claim 1, wherein steam from the bottom section of the vessel (1) is introduced into the dispersion or liquid.

7. A process as claimed in claim 1, wherein the dispersion is delivered from the separation vessel (4), by means of a pump (6), into a vessel (7) for finished product.

8. A process as claimed in claim 1, wherein high-viscosity dispersions or liquids are used.

* * * * *